United States Patent [19]

Brotz et al.

[11] 3,979,347
[45] Sept. 7, 1976

[54] LUBRICANT CONTAINING POLY(VINYL CHLORIDE) MOLDING COMPOSITION

[75] Inventors: Walter Brotz, Gersthofen; Fred Mader, Nordendorf

[73] Assignee: Hoechst Aktiengesellschaft, Frankfurt am Main, Germany

[22] Filed: Sept. 3, 1974

[21] Appl. No.: 502,556

Related U.S. Application Data

[63] Continuation of Ser. No. 370,240, June 15, 1973, abandoned, which is a continuation-in-part of Ser. No. 322,137, Jan. 9, 1973, abandoned.

[52] U.S. Cl. .................. 260/28.5 D; 260/897 C; 264/211; 264/300
[51] Int. Cl.² .................. C08L 27/06; C08L 91/06; D01F 1/02
[58] Field of Search .......... 260/28.5 D, 92.8 R, 260/92.8 W, 897 C, 92.8 A; 264/211, 300

[56] References Cited

UNITED STATES PATENTS

| | | | |
|---|---|---|---|
| 3,442,837 | 5/1969 | Brotz et al. | 264/300 |
| 3,661,839 | 5/1972 | Klopfer | 260/28.5 D |
| 3,756,999 | 9/1973 | Stetter et al. | 260/88.2 S |
| 3,757,001 | 9/1973 | Reiter et al. | 260/92.8 |
| 3,819,554 | 6/1974 | Blanchard | 260/897 C |

*Primary Examiner*—Allan Lieberman
*Attorney, Agent, or Firm*—Connolly and Hutz

[57] ABSTRACT

As lubricants for processing poly(vinyl chloride), there are used polyolefin oxidates having a content of from 20 to 80 weight % of dicarboxylic acids, an acid number of from 30 to 150 and a saponification number of from 40 to 220. Partial esters and salts of the indicated polyolefin oxidates are also appropriate. Shaped articles made from a PVC containing these lubricants have a very high degree of transparence.

2 Claims, No Drawings

LUBRICANT CONTAINING POLY(VINYL CHLORIDE) MOLDING COMPOSITION

This application is a continuation of application Ser. No. 370,240 filed June 15, 1973 and now abandoned, which is a continuation-in-part application of abandoned application Ser. No. 322,137 filed Jan. 9, 1973.

Poly(vinyl chloride) (PVC) can be processed to shaped articles having smooth and brilliant surfaces only when a lubricant is used. Known lubricants are fatty acids, esters of fatty acids and mono- or polyhydric alcohols, metal soaps of fatty acids or hydrocarbon waxes. Very active lubricants are the esters and partially saponified esters of wax acids, for example of industrial grade montanic acids.

All these products have certain disadvantages. For example, fatty acids exudate from PVC in the course of processing and during storage. Fatty acid esters have an insufficient lubricating activity, since their molecular weight is too low and their solubility in the polymer therefore of a too high degree, so that there is too much power consumption of the machines as a consequence. Metal soaps of fatty acids and hydrocarbon waxes reduce the transparence of the PVC more than desired. Moreover, these latter compounds can only be used within very limited concentration ranges. In the case where this limit is exceeded, the mixture is overlubricated, gelation and also the mechanical strength of the shaped articles made from the so treated PVC are insufficient.

Also the products having a most favorable lubricating effect, i.e. the derivatives of wax acids, are not satisfactory with respect to the transparence of the plastic material, and their most substantial disadvantage is their high cost as compared to other known lubricants.

A process has now been found for the manufacture of a lubricant containing molding composition on the basis of poly (vinyl chloride), which comprises mixing poly(vinyl chloride) with 0.05 to 2.0 weight %, relative to the amount of poly (vinyl chloride), of a lubricant being composed of an oxidation product of polyethylene or a copolymer of ethylene and an α-olefin having from 3 to 8 carbon atoms; the oxidation product having an acid number of from 30 to 150, a saponification number of from 40 to 220 and a dicarboxylic acid content of from 20 to 80 weight %.

Subject of the present invention is furthermore a molding composition on the basis of poly(vinyl chloride) which contains from 0.05 to 2.0 weight %, relative to the amount of poly(vinyl chloride), of a lubricant composed of an oxidation product of polyethylene or a copolymer of ethylene and an α-olefin having from 3 to 8 carbon atoms; the oxidation product having an acid number of from 30 to 150, a saponification number of from 40 to 220 and a dicarboxylic acid content of from 20 to 80 weight %.

The oxidation products to be used in accordance with the present invention are obtained by oxidation of polyethylenes or copolymers of ethylene and α-olefins having from 3 to 8 carbon atoms, which compounds have molecular weights of from 10,000 to 1,000,000 preferably from 40,000 to 100,000, with oxygen or oxygen containing gases in the melt, in the presence of liquid dispersing agents inert to oxygen, for example water, while constantly and thoroughly mixing the reactants under pressures of from 0 to 100 atm/gauge (cf. German Patent Application laid open to public inspection DOS 2 035 706). Suitable oxidation products have acid numbers of from 30 to 150 and saponification numbers of from about 40 to 220, and they contain from 20 to 80 weight % of dicarboxylic acids. Esterification products and salts, for example alkaline earth metal salts, lead salts or cadmium salts, are obtained from the oxidation products in known manner by reaction with, preferably, diols having from 2 to 4 carbon atoms, or with metal oxides, metal hydroxides or carbonates.

The lubricating activity of the oxidation products used in the process of the invention and of their salts in the processing of PVC is about the same as that of the montanic acid esters and salts especially advantageous as lubricating agents, but with respect to maintaining the transparence, the cited oxidates and their salts are substantially superior to the known lubricants. The partial esters and partially saponified esters of the polyolefin oxidation products give even better results: they are appropriate for the manufacture of highly transparent shaped articles, thereby attaining or even exceeding the lubricating effect of the montanic acid esters.

The amount of lubricant required is from 0.05 to 2.0, preferably from 0.1 to 1 %, relative to the weight of the PVC used. The lubricant is generally added in the form of a powder to the mixture of the thermoplastic material and other additives, for example stabilizers and dyestuffs, which is to be processed.

The following examples illustrate the invention; the parts indicated being by weight.

EXAMPLE 1:

a. 333 g of a commercial polyethylene powder having a density of 0.96 g/cm$^3$, a melt index of 0.3 g/10 min, a reduced specific viscosity of 3.43 dl/g, and a crystallite melting point of 131°C are mixed with 2 l of water and 0.5 weight %, calculated on the polyethylene, of tert-.butylhydroperoxide in an autoclave having a capacity of 5 l. At a temperature of 135°C and a pressure of 50 atm gauge, 40 l of air per hour are introduced into the mixture, while stirring. After the reaction time of 15 hours has run out, the stirrer and heating are turned off. The oxidation product which has precipitated after cooling is separated from the water, is then ground in the presence of fresh water, filtered off and dried. It shows an acid number of 137, a saponification number of 197, and a flow point/drop point of 103/103.5°C.

b. A mixture of
  100.0 parts of suspension poly(vinyl chloride) (SPVC) having a K value of 65,
  1.5 parts of dibutyl-tin-dithioglycolic acid ester, and
  0.5 parts of the above polyethylene oxidation product is processed in a heated roll mill at 180°C. The rolling time until the material sticks to the roll is 33 minutes.

c. A plate having a thickness of 2 mm is molded from a similar mixture, rolled with addition of 1 part of the above oxidation product. The plate has a 77 % transparence.

d. For a comparison: Using an ester of montanic acid with ethylene-glycol, the rolling time is 44 minutes, and the transparence amounts to 36 %.

EXAMPLE 2:

a. According to the process of Example (1a) (the temperature being 140°C and the amount of polyethylene being 200 g) a polyethylene oxidate is prepared which shows an acid number of 103. This oxidate is esterified with ethylene glycol in the presence of a catalytic amount of sulfuric acid until an acid number of 27 is reached.

b. A mixture of 100.0 parts of SPVC (K value 65), 1.5 parts of dibutyl-tin-dithioglycolic acid ester, and 0.5 parts of the above esterified oxidate is processed on a heated roll mill at 180°C. The rolling time until the material sticks to the roll is 46 minutes.

c. A plate having a thickness of 2 mm is molded from a similar mixture and rolled with addition of 1 part of the above esterified oxidate, which plate has a 82 % transparence.

d. For a comparison: Using an ester of montanic acid with ethylene glycol, the rolling time is 44 minutes, and the transparence amounts to 36 %.

EXAMPLE 3:

a. 500 g of a copolymer consisting of 99 % of ethylene, and 1 % of a α-butylene, which copolymer has a density of 0.95 g/cm$^3$, a melt index of 1.5 g/10 min, a reduced specific viscosity of 3.29 dl/g, and a crystallite melting point of 130°C are mixed with 2 l of water and 2 g of tert.butylhydroperoxide in an enamel pressure vessel. At a temperature of 140°C and a pressure of 10 atm gauge, 100 l of air per hour are introduced into the mixture, while stirring vigorously, the afore-mentioned pressure being maintained by way of regulation of the amount of exhaust gas. After the reaction time of 23 hours has run out, the mixture is cooled, while stirring, the precipitated oxidation product is filtered off, washed with water, and dried. It shows an acid number of 85, a saponification number of 154, a flow point/drop point of 108/108.5°C, and a reduced viscosity of 0.075 dl/9. The oxidate obtained is neutralized by addition of calcium hydroxide, while stirring, until an acid number of 20 is reached.

b. A mixture of 100.0 parts of SPVC (K value 65), 1.5 parts of dibutyl-tin-dithioglycolic acid ester, and 0.5 parts of the above calcium soap is processed on a heated roll mill at 180°C. The rolling time until the material sticks to the roll is 48 minutes.

c. A plate having a thickness of 2 mm is molded from a mixture and rolled in similar manner with addition of 1 part of the above calcium soap, the transparence of which plate is 77 %.

d. For a comparison: Using an ester of montanic acid with ethylene glycol partially neutralized with calcium hydroxide, the rolling time is 45 minutes and the transparence 61 %.

What is claimed is:

1. A molding composition consisting of 100 parts by weight poly(vinyl chloride) and from 0.05 to 2.0 parts by weight as a lubricant of an oxidation product of polyethylene or a copolymer of ethylene and an α-olefin having from 3 to 8 carbon atoms, which polyethylene or ethylene and α-olefin copolymer have a molecular weight of 10,000 to 1,000,000, said oxidation product being prepared by treatment of a dispersion of said homopolymer or copolymer with oxygen or an oxygen-containing gas in the melt in the presence of a liquid dispersing agent inert to oxygen while constantly and thoroughly mixing the liquids under a pressure of from zero to 100 atmospheres gauge; said oxidation product having an acid number of from 30 to 150, a saponification number of from 40 to 220 and a dicarboxylic acid content of from 20 to 80 weight %.

2. The molding composition as claimed in claim 1, wherein the oxidation product is in a partially esterified form or in the form of a salt.

* * * * *